(12) United States Patent
Chen et al.

(10) Patent No.: US 12,537,634 B2
(45) Date of Patent: Jan. 27, 2026

(54) COMMUNICATION METHOD AND COMMUNICATION SYSTEM USING TWO-DIMENSIONAL PRIMARY SYNCHRONIZATION SIGNALS

(71) Applicant: NATIONAL CHENG KUNG UNIVERSITY, Tainan (TW)

(72) Inventors: Chao-Yu Chen, Tainan (TW); Hsuan-Po Lin, New Taipei (TW); Zhen-Ming Huang, Taichung (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 371 days.

(21) Appl. No.: 18/461,527

(22) Filed: Sep. 6, 2023

(65) Prior Publication Data
US 2024/0322957 A1 Sep. 26, 2024

(30) Foreign Application Priority Data
Mar. 23, 2023 (TW) .................. 112110842

(51) Int. Cl.
*H04L 5/00* (2006.01)
(52) U.S. Cl.
CPC ............ *H04L 5/001* (2013.01); *H04L 5/0048* (2013.01)
(58) Field of Classification Search
None
See application file for complete search history.

(56) References Cited

U.S. PATENT DOCUMENTS

| 8,442,141 B1 * | 5/2013 | Zhang | H04L 1/06 375/267 |
|---|---|---|---|
| 2017/0135052 A1 | 5/2017 | Lei et al. | |
| 2018/0041949 A1 | 2/2018 | Liu et al. | |
| 2022/0217034 A1 * | 7/2022 | Han | H04L 5/0053 |
| 2023/0300633 A1 * | 9/2023 | Bernsen | H04L 63/08 370/252 |
| 2024/0322957 A1 * | 9/2024 | Chen | H04L 5/0048 |

FOREIGN PATENT DOCUMENTS

| CA | 3168676 A1 * | 8/2021 | .......... H04J 11/0023 |
|---|---|---|---|
| CN | 103313377 A | 9/2013 | |
| CN | 108282434 A | 7/2018 | |
| KR | 20200096366 A | 8/2020 | |
| TW | 201640938 A | 11/2016 | |
| WO | WO-2022098767 A1 * | 5/2022 | .......... H04J 11/0076 |
| WO | WO-2024014226 A1 * | 1/2024 | .......... H04L 5/0094 |

* cited by examiner

*Primary Examiner* — Christopher T Wyllie
(74) *Attorney, Agent, or Firm* — CKC & Partners Co., LLC (57) ABSTRACT

A communication method and communication system using two-dimensional primary synchronization signals are provided. The communication system includes a base station and a user equipment. The communication method includes: providing a two-dimensional synchronization array collection having a zero correlation zone; generating plural primary synchronization signals (PSSs) in accordance with the two-dimensional synchronization array collection; generating a synchronization signal block (SSB) in accordance with the primary synchronization signals, in which the synchronization signal block is adapted for new radio (NR) technology, and each one of the primary synchronization signals corresponds to plural orthogonal frequency division multiplexing (OFDM) symbols and plural subcarrier signals; and performing a communication operation by using the synchronization signal block.

16 Claims, 6 Drawing Sheets

COMMUNICATION METHOD AND COMMUNICATION SYSTEM USING TWO-DIMENSIONAL PRIMARY SYNCHRONIZATION SIGNALS

RELATED APPLICATIONS

This application claims priority to Taiwan Patent Application Serial Number 112110842 filed Mar. 23, 2023, which is herein incorporated by reference.

BACKGROUND

Field of the Invention

The present disclosure relates to a communication method and a communication system using two-dimensional primary synchronization signals.

Description of Related Art

The wireless communication technology has been widely used to provide various types of communication contents, such as audios, videos, broadcast messages, and so on. The wireless communication technology has developed from the Long-Term Evolution (LTE) technology to the fifth generation (5G) New Radio (NR) technology. There has lower latency, higher bandwidth and/or higher data throughput while using the NR technology than using the LTE technology. It is necessary to use a primary synchronization signal (PSS) to perform a cell search with initial synchronization and detect a cell identity (ID) while using the NR technology for wireless communications.

SUMMARY

The present disclosure relates to a communication method and a communication system using two dimensional PSSs with good correlation properties, so as to simultaneously estimate timing offset and frequency offset to achieve a better error detection rate, and perform the cell search with the initial synchronization and detect the cell ID. In addition, the communication method and the communication system can also counteract the effect of symbol timing offset (STO) effectively.

One aspect of the present disclosure relates to a communication method using two dimensional PSSs. The communication method includes providing a set of two-dimensional synchronization arrays with a zero-correlation zone. The communication method also includes generating two-dimensional PSSs according to the set of two-dimensional synchronization arrays. The communication method further includes generating a synchronization signal block (SSB) according to the two-dimensional PSSs, in which the synchronization signal block is adapted to New Radio (NR) technology, and each of the two-dimensional PSSs corresponds to orthogonal frequency division multiplexing (OFDM) symbols and subcarrier signals. The communication method still further includes performing a communication operation by utilizing the SSB.

In accordance with one or more embodiments of the present disclosure, the set of two-dimensional synchronization arrays is a set of Golay complementary arrays.

In accordance with one or more embodiments of the present disclosure, the set of two-dimensional synchronization arrays is a set of zero-correlation zone complementary arrays.

In accordance with one or more embodiments of the present disclosure, the SSB includes the two-dimensional PSSs, secondary synchronization signals (SSSs) and physical broadcast channels (PBCHs).

In accordance with one or more embodiments of the present disclosure, each of the 2D-PSSs corresponds to $L_1$ OFDM symbols and $L_2$ subcarrier signals, where $L_1$ is an integer less than the number of symbols in the SSB, and $L_2$ is an integer less than a half the number of subcarrier signals in the SSB.

In accordance with one or more embodiments of the present disclosure, a signal interval between the two-dimensional PSSs corresponds to the OFDM symbols and at least one subcarrier signal.

In accordance with one or more embodiments of the present disclosure, the communication operation includes generating a radio signal by utilizing the SSB and transmitting the radio signal. The communication operation also includes performing a reception operation to use a user equipment (UE) to receive the radio signal and performing communications according to the radio signal, in which the reception operation includes performing a time-domain process to simultaneously evaluate a STO and a fractional frequency offset (FFO) of the communication operation according to the SSB. The reception operation also includes performing a frequency-domain process to perform a cross-correlation operation according to the SSB to obtain an OFDM symbol offset, a sector ID and an integer frequency offset (IFO).

In accordance with one or more embodiments of the present disclosure, the frequency-domain process calculates the OFDM symbol offset, the sector ID and the IFO according to the following equation:

$$(\hat{u}, \hat{\varepsilon}_I, \hat{\tau}) = \arg\max_{u, \varepsilon_I, \tau} \left| \sum_{h=0}^{M-1} \sum_{k=0}^{N-1} D_h^{(u)}[k] R_{h+\tau}^*[k + \varepsilon_I] \right|,$$

where $u$, $\hat{u}$ are sector IDs; $\varepsilon_I$, $\hat{\varepsilon}_I$ are IFOs; $\tau$, $\hat{\tau}$ are OFDM symbol offsets; M and N are dimensions of the two-dimensional PSSs in time-domain and frequency-domain, respectively; $D_h^{(u)}[k]$ is a signal part of the two-dimensional PSSs generated by the sector ID u in the $h^{th}$ OFDM symbol and the $k^{th}$ subcarrier signal;

$$R_{h+\tau}^*[k]$$

is a signal part of the radio signal in the $(h+\tau)^{th}$ OFDM symbol and the $k^{th}$ subcarrier signal.

Another aspect of the present disclosure relates to a communication system using two dimensional PSSs. The communication system includes a base station configured to generate two-dimensional PSSs according to the set of two-dimensional synchronization arrays, in which the set of two-dimensional synchronization arrays has a zero-correlation zone. The base station also configured to generate a SSB according to the two-dimensional PSSs, in which the SSB is adapted to NR technology, and each of the two-dimensional PSSs corresponds to a plurality of OFDM symbols and subcarrier signals. The base station further configured to perform a communication operation by utilizing the SSB. The communication system also includes an UE that is configured to receive the radio signal and communicating by the radio signal.

In accordance with one or more embodiments of the present disclosure, the set of two-dimensional synchronization arrays is a set of Golay complementary arrays.

In accordance with one or more embodiments of the present disclosure, the set of two-dimensional synchronization arrays is a set of zero-correlation zone complementary arrays.

In accordance with one or more embodiments of the present disclosure, the SSB includes the two-dimensional PSSs, SSSs, and PBCHs.

In accordance with one or more embodiments of the present disclosure, each of the 2D-PSSs corresponds to $L_1$ OFDM symbols and $L_2$ subcarrier signals, where $L_1$ is an integer less than the number of symbols in the SSB, and $L_2$ is an integer less than a half the number of subcarrier signals in the SSB.

In accordance with one or more embodiments of the present disclosure, a signal interval between the two-dimensional PSSs corresponds to the OFDM symbols and at least one subcarrier signal.

In accordance with one or more embodiments of the present disclosure, when performing communications according to the radio signal, the UE is used to perform a time-domain process to simultaneously evaluate an STO and an FFO of the communication operation according to the SSB while using a UE to perform communications according to the radio signal, and is used to perform a frequency-domain process to perform a cross-correlation operation according to the SSB to obtain an OFDM symbol offset, a sector ID and an IFO.

In accordance with one or more embodiments of the present disclosure, the frequency-domain process calculates the OFDM symbol offset, the sector ID and the IFO according to the following equation:

$$(\hat{u}, \hat{\varepsilon}_I, \hat{\tau}) = \arg\max_{u, \varepsilon_I, \tau} \left| \sum_{h=0}^{M-1} \sum_{k=0}^{N-1} D_h^{(u)}[k] R_{h+\tau}^*[k + \varepsilon_I] \right|$$

where u, û are sector IDs; $\varepsilon_I$, $\hat{\varepsilon}_I$ are IFOs; $\tau$, $\hat{\tau}$ are OFDM symbol offsets; M and N are dimensions of the two-dimensional PSSs in time-domain and frequency-domain, respectively; $D_h^{(u)}[k]$ is a signal part of the two-dimensional PSSs generated by the sector ID u in the $h^{th}$ OFDM symbol and the $k^{th}$ subcarrier signal;

$$R_{h+\tau}^*[k]$$

is a signal part of the radio signal in the $(h+\tau)^{th}$ OFDM symbol and the $k^{th}$ subcarrier signal.

BRIEF DESCRIPTION OF THE DRAWINGS

This disclosure can be more fully understood by reading the following detailed description of the embodiment, with reference made to the accompanying drawings as follows.

DETAILED DESCRIPTION

The detailed explanation of the present disclosure is described as following. The described preferred embodiments are presented for purposes of illustrations and description, and they are not intended to limit the scope of the present disclosure.

Terms used herein are only used to describe the specific embodiments, which are not used to limit the claims appended herewith. Unless limited otherwise, the term "a," "an," "one" or "the" of the single form may also represent the plural form.

Figure 1:
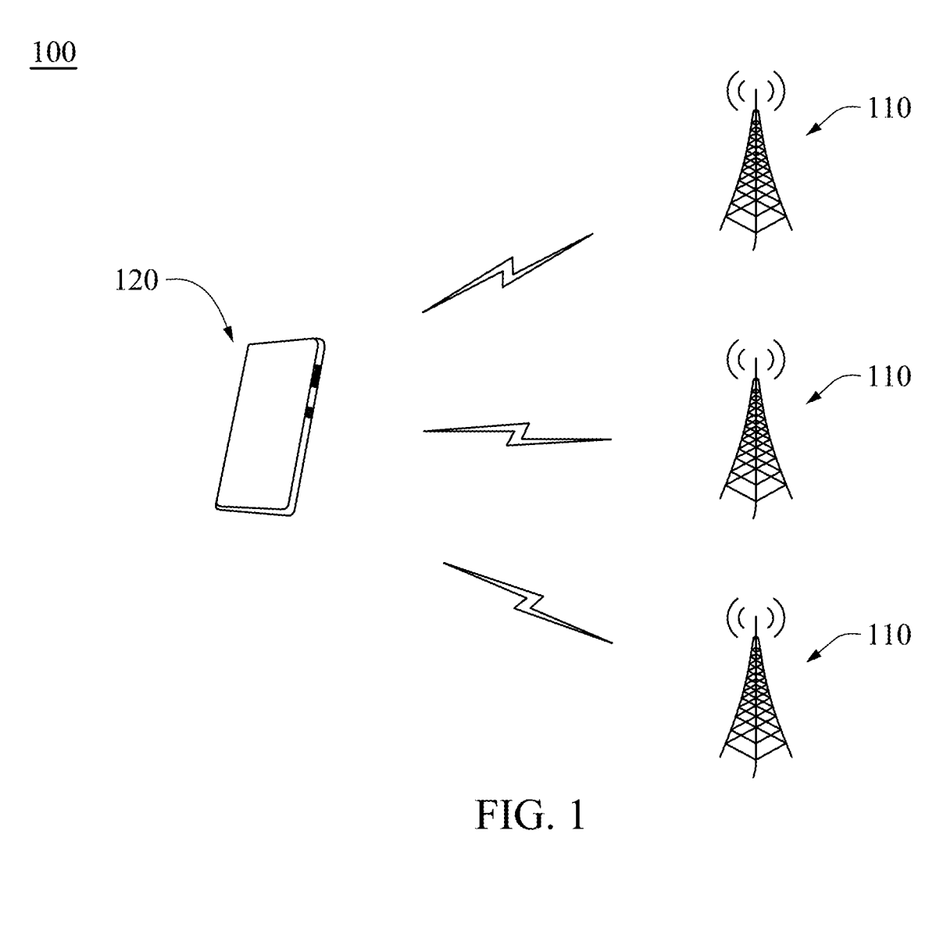
FIG. 1 is a schematic diagram of a communication system using a two-dimensional PSS in accordance with one embodiment of the present disclosure.

FIG. 1 is a schematic diagram of a communication system 100 using a two-dimensional PSS in accordance with one embodiment of the present disclosure. As shown in FIG. 1, the communication system 100 includes a base station 110 and a user equipment (UE) 120. The base station 110 is configured to transmit the radio signal to the UE 120 and/or receive the radio signal from the UE 120 for the purpose of wireless communications.

Figure 2:
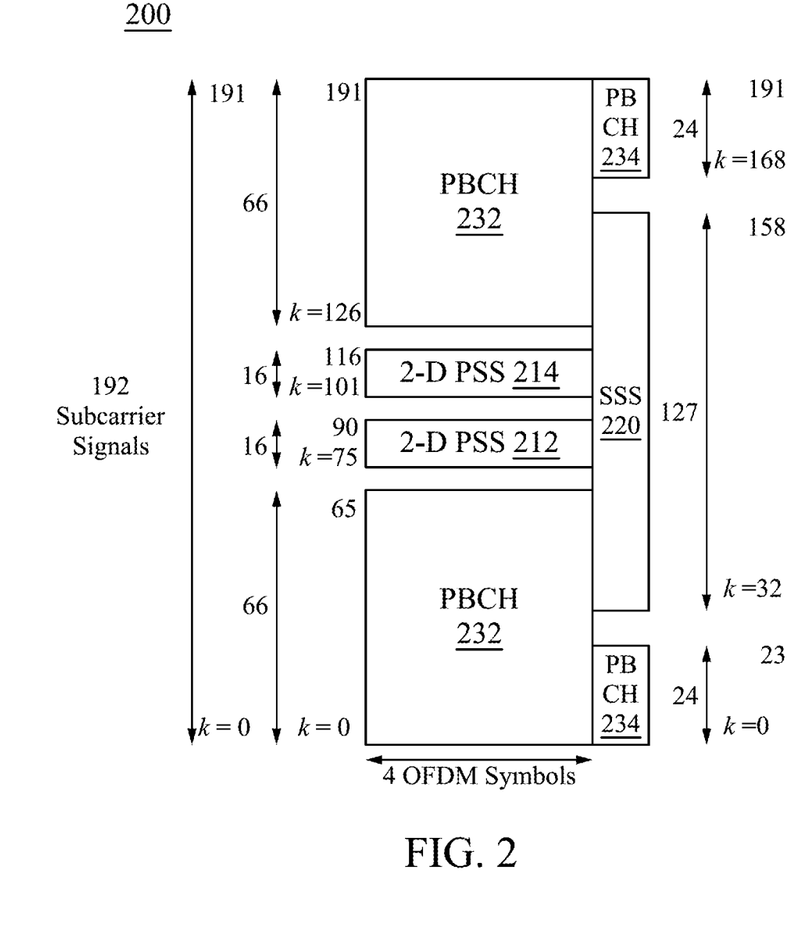
FIG. 2 is a schematic diagram of a two-dimensional PSS in accordance with one embodiment of the present disclosure.

In some embodiments, the UE 120 in the present disclosure may be a portable wireless communication device, such as a personal digital assistant (PDA), a notebook computer, a tablet computer, a smartphone, a wireless headset, a digital camera, a wireless access point (WAP) equipment and a television, but the present disclosure is not limited thereto. The communication system 100 is suitable for the fifth generation (5G) new radio (NR) technology, in which the radio signal transmitted by the base station 110 includes a synchronization signal block (SSB) 200 that is shown in FIG. 2. The SSB 200 includes primary synchronization signals (PSSs) 212 and 214, secondary synchronization signals (SSSs) 220, and physical broadcast channels (PBCHs) 232 and 234. The PSSs 212 and 214 may be used for calculating a sector ID, and the SSSs 220 may be used for calculating a group ID. In this way, the cell ID can be obtained by calculating the sector ID and the group ID.

Figure 3:
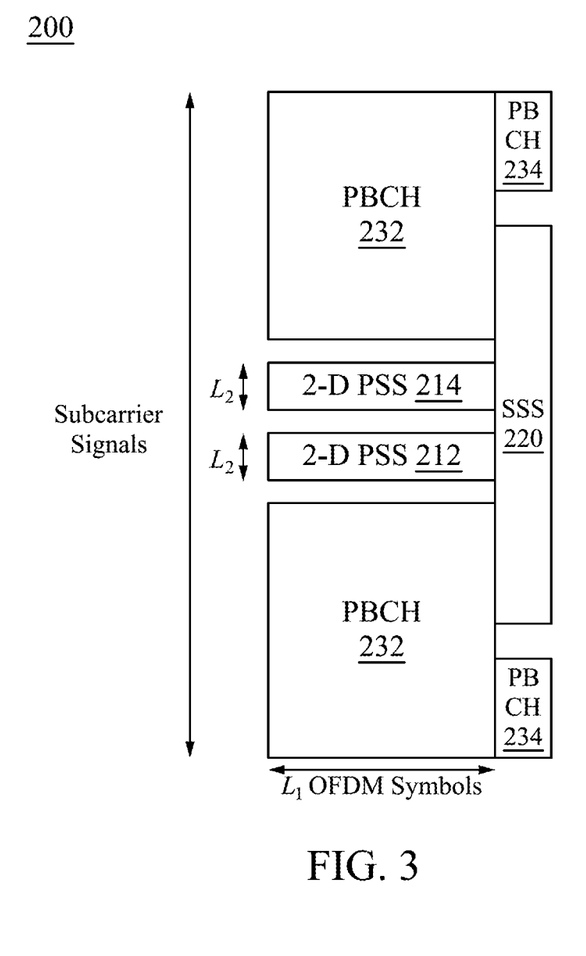
FIG. 3 is a schematic diagram of a two-dimensional PSS in accordance with one embodiment of the present disclosure.

Compared with the conventional SSB, the SSB 200 of the embodiment of the present disclosure includes two 2D-PSSs 212 and 214. For example, the 2D-PSSs 212 and 214 correspond to OFDM symbols and subcarrier signals. In this embodiment, the 2D-PSS 212 corresponds to the $75^{th}$ (k=75) to $90^{th}$ (k=90) subcarrier signals (totally 16 subcarrier signals), and the 2D-PSS 214 corresponds to the $101^{st}$ (k=101) to $116^{th}$ (k=116) subcarrier signals (totally 16 subcarrier signals), and the 2D-PSSs 212 and 214 correspond to 4 OFDM symbols. However, the present disclosure is not limited thereto. In some embodiments, as shown in FIG. 3, the 2D-PSSs 212 and 214 may correspond to $L_1$ OFDM symbols and $L_2$ subcarrier signals, in which $L_1$ and $L_2$ are positive integers. In some embodiments, $0<L_1<$the number of symbols in the SSB, and $0<L_2<$a half the number of subcarrier signals in the SSB, but the present disclosure is not limited thereto.

In the embodiments of the present disclosure, the 2D-PSSs 212 and 214 are generated according to the set of two-dimensional synchronization arrays, in which the arrays of the set of two-dimensional synchronization arrays have a zero-correlation zone. In this way, the 2D-PSSs 212 and 214 generated by the set of two-dimensional synchronization arrays can have OFDM orthogonality and avoid interferences between subcarrier signals.

Figure 4:
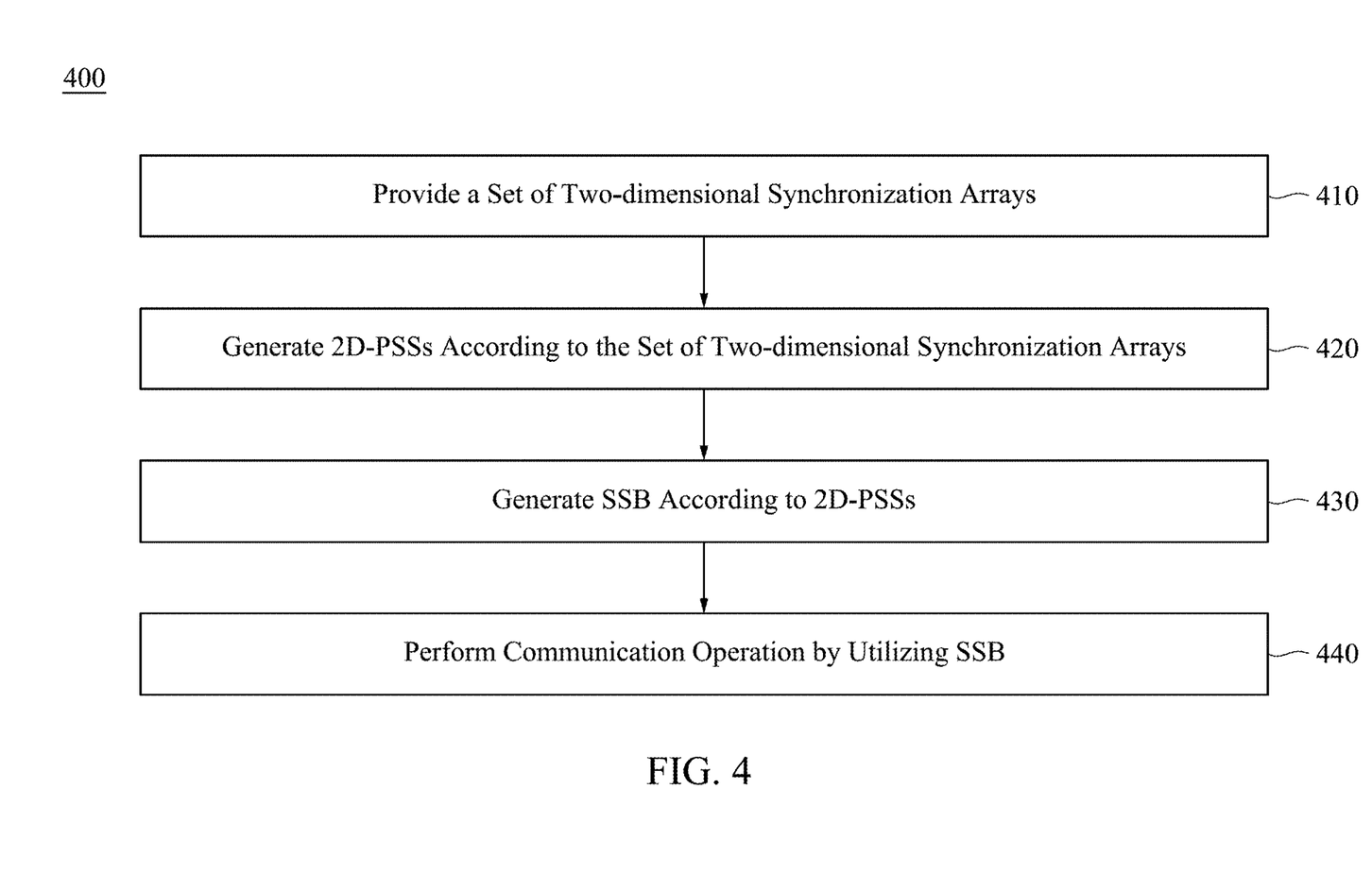
FIG. 4 is a flowchart of a communication method using a two-dimensional PSS in accordance with one embodiment of the present disclosure.

FIG. 4 is a flowchart of a communication method 400 using a 2D-PSS in accordance with one embodiment of the present disclosure. The communication method 400 is suitable for the communication system 100. In the communication method 400, Step 410 is first performed to provide a set of two-dimensional synchronization arrays. As mentioned previously, the arrays of the set of two-dimensional synchronization arrays have a zero-correlation zone. In some embodiments, the set of two-dimensional synchronization arrays may be a Golay complementary array set or a zero-correlation zone complementary (Z-complementary) array set, in which the Golay complementary array set includes a Golay complementary array pair, and the Z-complementary array set includes a Z-complementary array pair.

Figure 5:
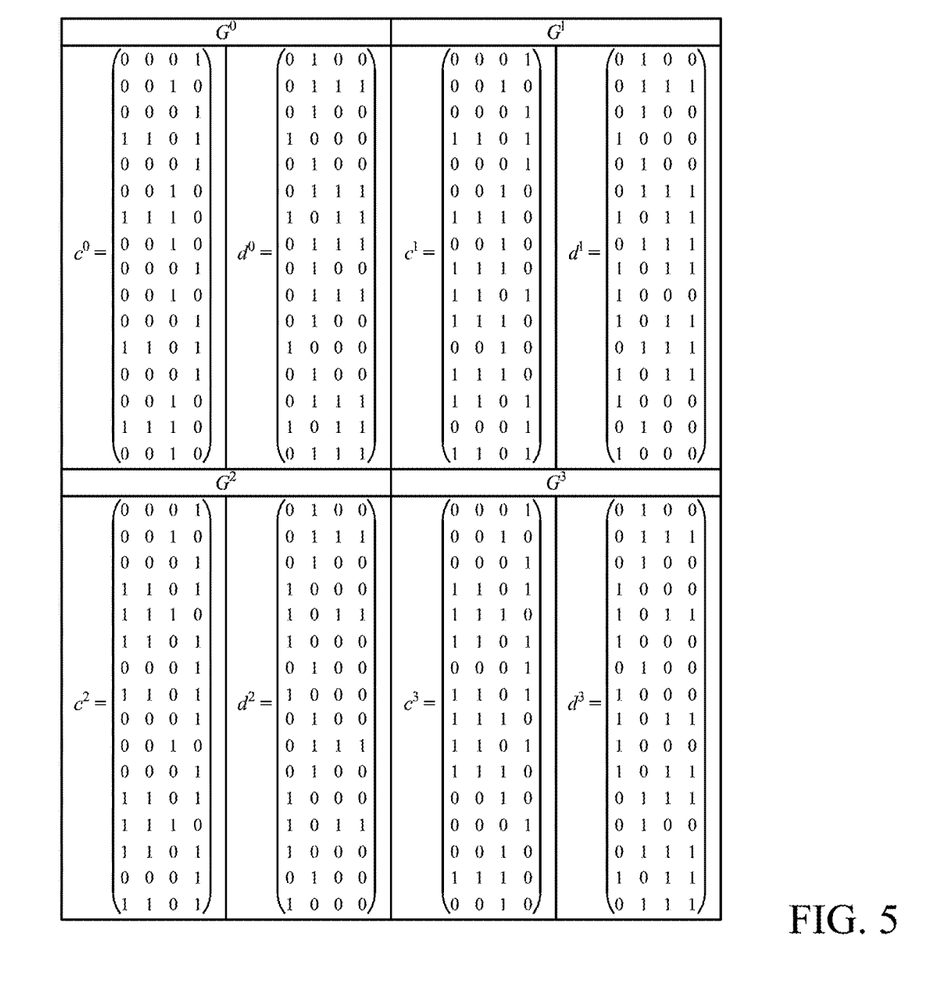
FIG. 5 is a set of zero-correlation zone complementary arrays in accordance with one embodiment of the present disclosure.

Then, Step 420 is performed, in which 2D-PSSs are generated according to the set of two-dimensional synchronization arrays. In this embodiment, Step 420 is performed to generate 2D-PSSs by using a Z-complementary array set. FIG. 5 is a Z-complementary array set in accordance with one embodiment of the present disclosure. As shown in FIG. 5, the Z-complementary array set includes arrays pairs $G^0$, $G^1$, $G^2$, and $G^3$, and each of the array pairs $G^0$-$G^3$ includes two complementary arrays. For example, the array pair $G^0$ includes complementary arrays $c^0$ and $d^0$; the array pair $G^1$ includes complementary arrays $c^1$ and $d^1$; the array pair $G^2$ includes complementary arrays $c^2$ and $d^2$; the array pair $G^3$ includes complementary arrays $c^3$ and $d^3$.

The array pair $G^0$-$G^3$ may be used to generate the 2D-PSSs 212 and 214. For example, the array $c^0$ of the array pair $G^0$ is used as the two-dimensional array value of the 2D-PSS 212, and the array $d^0$ of the array pair $G^0$ is used as the two-dimensional array value of the 2D-PSS 214. For another example, the array $c^1$ of the array pair $G^1$ is used as the two-dimensional array value of the 2D-PSS 212, and the array $d^1$ of the array pair $G^1$ is used as the two-dimensional array value of the 2D-PSS 214. For another example, the array $c^2$ of the array pair $G^2$ is used as the two-dimensional array value of the 2D-PSS 212, and the array $d^2$ of the array pair $G^2$ is used as the two-dimensional array value of the 2D-PSS 214. For another example, the array $c^3$ of the array pair $G^3$ is used as the two-dimensional array value of the 2D-PSS 212, and the array $d^3$ of the array pair $G^3$ is used as the two-dimensional array value of the 2D-PSS 214. Specifically, the arrays $c^0$-$c^3$ and $d^0$-$d^3$ are 16×4 matrices each corresponding to 16 subcarrier signals and 4 OFDM symbols.

Then, Step 430 is performed, in which the SSB 200 is generated according to the 2D-PSSs. The structure of the SSB 200 is shown in FIG. 2 and thus not repeated herein. In addition, although the physical broadcast channels 232 shown in FIG. 2 are two-dimensional blocks, the physical broadcast channels 232 can use a two-dimensional way to represent the value of the conventional one-dimensional physical broadcast channels 232.

Next, Step 440 is performed to use the SSB 200 to perform communications. For example, in FIG. 1, one of the base stations 110 generates the SSB 200 by performing Steps 410-430, and then generates a radio signal according to the SSB 200, and transmits the radio signal to the UE 120. After receiving the radio signal, the UE 120 calculates the group ID and the sector ID to obtain the cell ID corresponding to the radio signal for achieving cell searching and initial synchronization.

Figure 6:
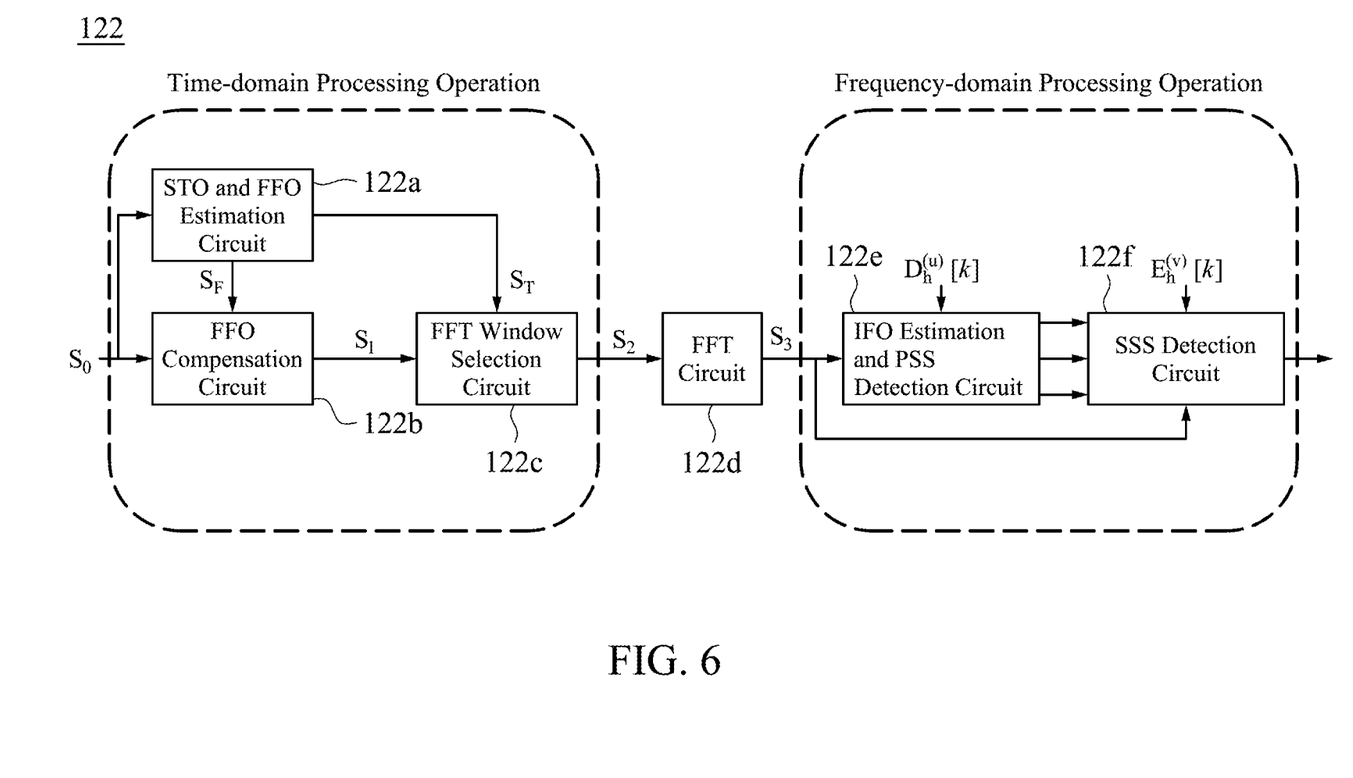
FIG. 6 is a schematic functional block diagram of synchronization signal processing circuit in accordance with one embodiment of the present disclosure.

For example, in some embodiments, the UE 120 includes a synchronization signal processing circuit 122 for performing a time-domain process and a frequency-domain process on the received signal. FIG. 6 is a schematic functional block diagram of the synchronization signal processing circuit 122 in accordance with one embodiment of the present disclosure. The synchronization signal processing circuit 122 includes an STO and FFO estimation circuit 122a, an FFO compensation circuit 122b, a fast Fourier transform (FFT) window selection circuit 122c, an FFT circuit 122d, an integer frequency offset (IFO) estimation and PSS detection circuit 122e, and an SSS detection circuit 122f. As shown in FIG. 6, the STO and FFO estimation circuit 122a receives a radio signal $S_0$ to calculate the corresponding STO and FFO, and outputs an STO signal $S_T$ and an FFO signal $S_F$.

In one embodiment of the present disclosure, the STO signal $S_T$ and the FFO signal $S_F$ are calculated from the following equation:

$$\hat{\tau}_s = \arg\max_{\tau} |C(\tau)|, \quad (1)$$

$$C(\tau) = \sum_{m=0}^{\frac{N_{SF}}{2}-1} \sum_{n=0}^{N_{CP}-1} r[m \times l + n] r*[m \times l + n + \tau],$$

$$\hat{\varepsilon}_F = \angle C(\hat{\tau}_s), \quad (2)$$

where $\hat{\tau}_s$ is a symbol timing, which represents the STO signal $S_T$ in FIG. 6; $C(\tau)$ is a correlation function value of the OFDM symbol offset $\tau$; $N_{SF}$ is the number of symbols in a subframe; l is the symbol length; $N_{CP}$ is the length of the cyclic prefix; m represents the number of symbols; n represents the number of signal samples; r represents received signals; $\hat{\varepsilon}_F$ is the FFO signal $S_F$ in FIG. 6.

The FFO compensation circuit 122b receives the radio signal $S_0$ and the FFO signal $S_F$ output by the STO and FFO estimation circuit 122a, so as to compensate the radio signal $S_0$ according to the FFO signal $S_F$ and obtain the compensated radio signal $S_1$. Then, the FFT window selection circuit 122c receives the compensated radio signal $S_1$, and selects an appropriate FFT window according to the STO signal $S_T$. Next, the FFT circuit 122d receives the signal $S_2$ outputted from the FFT window selection circuit 122c, and performs FFT on the signal $S_2$ to transform the signal to the frequency-domain.

Next, the IFO estimation and PSS detection circuit 122e receives the frequency-domain signal $S_3$ outputted from the FFT circuit 122d, and calculates the OFDM symbol offset, the sector ID and the IFO. In one embodiment of the present disclosure, the IFO estimation and PSS detection circuit 122e calculates the OFDM symbol offset, the sector ID and the IFO according to the following equation:

$$(\hat{u}, \hat{\varepsilon}_I, \hat{\tau}) = \arg\max_{u, \varepsilon_I, \tau} \left| \sum_{h=0}^{M-1} \sum_{k=0}^{N-1} D_h^{(u)}[k] R_{h+\tau}^*[k + \varepsilon_I] \right|, \quad (3)$$

where u, û are sector IDs; $\varepsilon_I$, $\hat{\varepsilon}_I$ are integer frequency offsets; $\tau$, $\hat{\tau}_I$ are OFDM symbol offsets; M and N are dimensions of the two-dimensional PSSs in time-domain and frequency-domain, respectively; $D_h^{(u)}[k]$ is a signal part of the two-dimensional PSSs generated by the sector ID u in the $h^{th}$ OFDM symbol and the $k^{th}$ subcarrier signal;

$$R_{h+\tau}^*[k]$$

is a signal part of the radio signal in the $(h+\tau)^{th}$ OFDM symbol and the $k^{th}$ subcarrier signal.

In one embodiment of the present disclosure, the IFO estimation and PSS detection circuit 122e performs a cross-correlation operation to calculate the cross-correlation function of the 2D-PSSs 212 and 214. Since the 2D-PSSs 212 and 214 are generated by using a Golay complementary array set or a Z-complementary array set, the 2D-PSSs 212 and 214 have better correlation function characteristics, thereby reducing the STO and the FFO.

Then, the SSS detection circuit 122f receives the frequency-domain signal $S_3$ outputted from the FFT circuit 122d and evaluates the sector ID û, the IFO $\hat{\varepsilon}_I$, the OFDM symbol offsets $\hat{\tau}_I$, and the SSS generated by the group ID which is used to calculate the group ID v in the signal part $E_h^{(v)}[k]$ of the $h^{th}$ OFDM symbol and the $k^{th}$ subcarrier signal. In this embodiment, the group ID $\hat{v}$ is determined from the following equation:

$$\hat{v} = \arg\max_v \left| \sum_{k=0}^{N-1} E_h^{(v)}[k] R_{h+\tau}^*[k + \hat{\varepsilon}_I] \right|. \quad (4)$$

In some embodiments, considering the multipath channel effect, Equation (3) can be expressed as the following:

$$(\hat{u}, \hat{\varepsilon}_I, \hat{\tau}) = \arg\max_{u, \varepsilon_I, \tau} \left\| \sum_{h=0}^{M-1} F_L^H D_{u,\varepsilon_I,h}^H R_{h+\tau} \right\|^2, \quad (5)$$

where $D_{u,\varepsilon_I,h} = \text{diag}\{D_h^{(u)}[0+\varepsilon_I], D_h^{(u)}[1+\varepsilon_I], \ldots, D_h^{(u)}[N-1+\varepsilon_I]\}$ is a diagonal matrix with the sector ID u in the $h^{th}$ OFDM symbol; $R_h = (R_h[0], R_h[1], \ldots, R_h[N-1])^T$; $F_L$ is an N×L sub-matrix of an N×N Fourier matrix F, and the Fourier matrix F is determined from the following equation:

$$F = \left[ e^{-j2\pi kl/N} \right]_{k,l}, \quad (k, l = 0, 1, \ldots, N-1) \quad (6)$$

where $(\cdot)^T$ represents a transpose matrix; $(\cdot)^H$ represents a Hermitian matrix.

In one embodiment of the present disclosure, the communication system 100 and the communication method 400 use a set of two-dimensional arrays with zero-correlation zone characteristics to generate 2D-PSSs. Since the 2D-PSSs have good correlation properties (zero-correlation), the UE 120 can simultaneously estimate the timing offset and frequency offset, achieve a better error detection rate, and perform a cell search with initial synchronization and detect a cell ID to effectively combat the effect by the STO.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of this disclosure. In view of the foregoing, it is intended that the present disclosure cover modifications and variations of this disclosure provided they fall within the scope of the following claims.

What is claimed is:

1. A communication method using two-dimensional primary synchronization signals for a communication system, the communication method comprising:
    providing a set of two-dimensional synchronization arrays with a zero-correlation zone;
    generating a plurality of two-dimensional primary synchronization signals (PSSs) according to the set of two-dimensional synchronization arrays;
    generating a synchronization signal block (SSB) according to the two-dimensional PSSs, wherein the synchronization signal block is adapted to New Radio (NR) technology, and each of the two-dimensional PSSs corresponds to a plurality of orthogonal frequency division multiplexing (OFDM) symbols and a plurality of subcarrier signals; and
    performing a communication operation by utilizing the SSB.

2. The communication method of claim 1, wherein the set of two-dimensional synchronization arrays is a set of Golay complementary arrays.

3. The communication method of claim 1, wherein the set of two-dimensional synchronization arrays is a set of zero-correlation zone complementary arrays.

4. The communication method of claim 1, wherein the SSB comprises the two-dimensional PSSs, secondary synchronization signals (SSSs), and physical broadcast channels (PBCHs).

5. The communication method of claim 4, wherein each of the two-dimensional PSSs corresponds to $L_1$ OFDM symbols and $L_2$ subcarrier signals, where $L_1$ is an integer less than the number of symbols in the SSB, and $L_2$ is an integer less than a half the number of subcarrier signals in the SSB.

6. The communication method of claim 1, wherein a signal interval between the two-dimensional PSSs corresponds to the OFDM symbols and at least one subcarrier signal.

7. The communication method of claim 1, wherein the communication operation comprises:
    generating a radio signal by utilizing the SSB and transmitting the radio signal; and
    performing a reception operation to use a user equipment (UE) to receive the radio signal and performing communications according to the radio signal, wherein the reception operation comprises:
        performing a time-domain process to simultaneously evaluate a symbol timing offset (STO) and a fractional frequency offset (FFO) of the communication operation according to the SSB; and
        performing a frequency-domain process to perform a cross-correlation operation according to the SSB to obtain an OFDM symbol offset, a sector ID and an integer frequency offset (IFO).

8. The communication method of claim 7, wherein the frequency-domain process calculates the OFDM symbol offset, the sector ID and the IFO according to the following equation:

$$(\hat{u}, \hat{\varepsilon}_I, \hat{\tau}) = \arg\max_{u,\varepsilon_I,\tau} \left| \sum_{h=0}^{M-1}\sum_{k=0}^{N-1} D_h^{(u)}[k] R_{h+\tau}^*[k+\varepsilon_I] \right|,$$

wherein u, û are sector IDs; $\varepsilon_I$, $\hat{\varepsilon}_I$ are IFOs; $\tau$, $\hat{\tau}$ are OFDM symbol offsets; M and N are dimensions of the two-dimensional PSSs in time-domain and frequency-domain, respectively; $D_h^{(u)}[k]$ is a signal part of the two-dimensional PSSs generated by the sector ID u in the $h^{th}$ OFDM symbol and the $k^{th}$ subcarrier signal;

$$R_{h+\tau}^*[k]$$

is a signal part of the radio signal in the $(h+\tau)^{th}$ OFDM symbol and the $k^{th}$ subcarrier signal.

9. A communication system, comprising:
 a base station configured to:
  generate a plurality of two-dimensional PSSs according to a set of two-dimensional synchronization arrays, wherein the set of two-dimensional synchronization arrays has a zero-correlation zone;
  generate an SSB according to the two-dimensional PSSs, wherein the SSB is adapted to NR technology, and each of the two-dimensional PSSs corresponds to a plurality of OFDM symbols and a plurality of subcarrier signals; and
  generate a radio signal by utilizing the SSB and transmit the radio signal; and
 a user equipment (UE) configured to receive the radio signal and perform a communication operation by utilizing the SSB.

10. The communication system of claim 9, wherein the set of two-dimensional synchronization arrays is a set of Golay complementary arrays.

11. The communication system of claim 9, wherein the set of two-dimensional synchronization arrays is a set of zero-correlation zone complementary arrays.

12. The communication system of claim 9, wherein the SSB comprises the two-dimensional PSSs, SSSs, and PBCHs.

13. The communication system of claim 12, wherein each of the two-dimensional PSSs corresponds to $L_1$ OFDM symbols and $L_2$ subcarrier signals, where $L_1$ is an integer less than the number of symbols in the SSB, and $L_2$ is an integer less than a half the number of subcarrier signals in the SSB.

14. The communication system of claim 9, wherein a signal interval between the two-dimensional PSSs corresponds to the OFDM symbols and at least one subcarrier signal.

15. The communication system of claim 9, wherein while using a UE to perform communications according to the radio signal, the UE is used to:
 perform a time-domain process to simultaneously evaluate an STO and an FFO of the communication operation according to the SSB; and
 perform a frequency-domain process to perform a cross-correlation operation according to the SSB to obtain an OFDM symbol offset, a sector ID and an IFO.

16. The communication system of claim 15, wherein the frequency-domain process calculates the OFDM symbol offset, the sector ID and the IFO according to the following equation:

$$(\hat{u}, \hat{\varepsilon}_I, \hat{\tau}) = \arg\max_{u,\varepsilon_I,\tau} \left| \sum_{h=0}^{M-1}\sum_{k=0}^{N-1} D_h^{(u)}[k] R_{h+\tau}^*[k+\varepsilon_I] \right|$$

wherein u, û are sector IDs; $\varepsilon_I$, $\hat{\varepsilon}_I$ are IFOs; $\tau$, $\hat{\tau}$ are OFDM symbol offsets; M and N are dimensions of the two-dimensional PSSs in time-domain and frequency-domain, respectively; $D_h^{(u)}[k]$ is a signal part of the two-dimensional PSSs generated by the sector ID u in the $h^{th}$ OFDM symbol and the $k^{th}$ subcarrier signal;

$$R_{h+\tau}^*[k]$$

is a signal part of the radio signal in the $(h+\tau)^{th}$ OFDM symbol and the $k^{th}$ subcarrier signal.

* * * * *